(12) United States Patent
Shmilovich et al.

(10) Patent No.: US 6,763,651 B2
(45) Date of Patent: Jul. 20, 2004

(54) ACTIVE SYSTEM FOR WIDE AREA SUPPRESSION OF ENGINE VORTEX

(75) Inventors: Arvin Shmilovich, Huntington Beach, CA (US); Yoram Yadlin, Irvine, CA (US); David M. Smith, Santa Ana, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 10/280,411

(22) Filed: Oct. 25, 2002

(65) Prior Publication Data

US 2004/0079834 A1 Apr. 29, 2004

(51) Int. Cl.⁷ .................................................. F02G 3/00
(52) U.S. Cl. ................................ 60/39.092; 244/53 B
(58) Field of Search .............................. 244/53 B, 53 R, 244/199, 207; 60/39.092, 230, 231; 55/306

(56) References Cited

U.S. PATENT DOCUMENTS

| | | | |
|---|---|---|---|
| 2,915,262 A | | 12/1959 | Klein |
| 3,298,637 A | | 1/1967 | Lee |
| 3,400,902 A | * | 9/1968 | King |
| 3,527,430 A | | 9/1970 | Smith |
| 3,599,429 A | | 8/1971 | Bigelis et al. |
| 4,070,827 A | * | 1/1978 | Vanfleet et al. |
| 4,586,683 A | * | 5/1986 | Kerker |
| 4,749,151 A | * | 6/1988 | Ball et al. |
| 5,915,651 A | | 6/1999 | Asaki et al. |
| 6,129,309 A | | 10/2000 | Smith et al. |

OTHER PUBLICATIONS

S. Brix, et al., *The Inlet–Vortex System of Jet Engines Operating Near the Ground,* Institute of Aerospace Engineering Technical University (RWTH) Aachen, 2000, AIAA–2000–3998, pp. 75–85.

* cited by examiner

*Primary Examiner*—Tien Dinh
(74) *Attorney, Agent, or Firm*—Alston & Bird LLP

(57) ABSTRACT

The active system for the wide area suppression of a ground vortex generated by the engine of an aircraft includes an actuator assembly in fluid communication with a fluid source; and, at least one nozzle assembly, including at least one movable nozzle. The movable nozzle is in fluid communication with the actuator assembly for receiving fluid from the actuator assembly. The actuator assembly controls the motion of the movable nozzle, wherein fluid is injected over a desired region relative to an inlet of the engine to disrupt the flow structure of a ground vortex, thus mitigating ground vortex ingestion. This ensures the operational health of the engine during airplane maneuvering on the ground.

23 Claims, 9 Drawing Sheets t=0.38 sec t=1.14 sec t=0 t=0.76 sec

After jet activation

Before jet activation

After jet activation

Before jet activation

ACTIVE SYSTEM FOR WIDE AREA SUPPRESSION OF ENGINE VORTEX

BACKGROUND OF THE INVENTION

1. Field of the Invention

The present invention relates to gas turbine engines (turbo-prop or turbo-jet) used for aircraft propulsion and is particularly directed to an active control method and apparatus for the alleviation of the ground vortex ingested by the engine.

2. Description of the Related Art

Aircraft with engines mounted relatively close to the ground develop vortex activity during high-power, low speed and/or static ground operation. The ground vortex can generate high velocities near the ground, capable of dislodging foreign objects from the surface. This debris can become entrained in the airflow drawn into the engine inlet. The abrasion resulting from dust and dirt ingestion cause engine performance deterioration and reduced service life. Moreover, if the ingested debris includes large objects, engine failure with catastrophic consequences may result. The vortex can also create severe enough distortion to the core flow of the engine to result in engine surge.

The problems stemming from ground vortex ingestion are especially acute for large, heavy transport airplanes. Vortex ingestion greatly hinders the ability of these aircraft to land in austere fields and to perform essential ground maneuvers on unimproved terrain. Consequently, this can pose a severe limitation on their global reach.

In addition, some of the new commercial airplane concepts developed in recent years have a higher propensity for engine vortex formation due to unique propulsion-airframe configurations.

As will be disclosed below, the present invention provides the means to annihilate the ground vortex. Consequently, it prevents damage and/or premature engine removal caused by foreign object ingestion or engine surge.

The ground vortex phenomenon is schematically described in FIG. 1 (Prior Art). At low speeds the suction generated by the engine 1 results in the formation of a stagnation point 2 on the ground (like a vacuum cleaner effect). Usually, the ambient flow contains significant amounts of vorticity 3 (turbulence) due to gusts, ground turbulence, wake flow of neighboring aircraft components (i.e., wing, fuselage) and mixing of engine reverser plumes (when thrust-reversers are deployed). The mechanism of ground vortex formation is the amplification of the seed vorticity in the ambient flow due to the stretching of the contracting streamlines 4 approaching the engine inlet. This interaction results in a concentrated vortex 5 originating at the ground plane 6 and terminating inside the engine. Flow visualization indicates that the flowfield is unsteady, and the movement of the point of origination of the vortex on the ground is sporadic. Consequently, the vortex filament fluctuates over a significant portion of the lower inlet sector. The rotational flowfield induced by the ground vortex is the cause for kicked up dust and dirt, and it is a major source of engine compressor erosion. In addition, the tornado-like flow is capable of dislodging sizable foreign objects off the ground, causing Foreign Object Damage (FOD) to the engine. Another major concern is the inlet distortion created by the ground vortex, which may result in engine surge. As can be further seen in this figure, as the head wind velocity increases the streamlines become less stretched until there is little interaction between the engine inlet and the ground plane.

There have been several attempts to solve the engine problems stemming from ground vortex ingestion. In some of these approaches compressor bleed air is being used as a source for jets of air directed down and forward of the engine. The device described in U.S. Pat. No. 2,915,262, issued to H. J. Klein, uses a blow away jet that impinges on the ground, fans out forward of the engine and prevents the formation of the ground vortex. Other devices that utilize aft blowing jets underneath the engine cowl have been described in U.S. Pat. No. 3,599,429, issued to Bigelis et al. and U.S. Pat. No. 4,070,827, issued to Vanfleet et al. These jets produce entrainment underneath the engine, thus blocking the airflow from moving forward in the space between the bottom of the nacelle and the ground. These devices are used on commercially operated transports having wing mounted engines hung close to the ground which are generally operated over relatively clean surfaces.

A protective screen concept for alleviating engine FOD is described in U.S. Pat. No. 3,298,637, issued to Shao-Tang Lee. It requires the modification of the engine at the intake to include an encircling enlarged hollow conduit containing a series of holes around its circumference. Pressurized air is discharged through the holes to create an air screen to restrain or block dust that would tend to be thrown up by the engine at high power setting. This protective screen arrangement is a continuous flow system that creates a curtain of air to prevent the stagnation point from forming, requiring a large amount of bleed air and consequently draining the engine power. The creation of the air curtain will also cause a large amount of debris to become airborne, potentially causing more FOD problems. The configuration also requires a series of channels and doors to duct and direct the airflow, increasing the complexity and cost of the system.

A more recent attempt to solve the ground vortex is disclosed in U.S. Pat. No. 5,915,651, issued to Asaki et al. This device is operational in conjunction with the thrust reverser of a turbofan engine. During thrust reverser deployment the flow from a fan air bypass duct is being redirected downward and aft in order to create an air curtain for preventing inlet suction from underneath the engine. However, it has been demonstrated that in order for this device to obviate vortex activity, excessive amounts of airflow are needed, thus compromising the engine performance. Additionally, the high velocity air impinging on the ground blows dust and heavier objects up off the ground. This defeats the purpose of eliminating engine FOD, and also impairs crew's visibility.

Another system to prevent ground inlet vortices is shown in U.S. Pat. No. 6,129,309, issued to Smith, et al. This system uses pulsating high pressure air to alternatively eject a control flow from two stationary nozzles mounted underneath the engine nacelle. The injection nozzles are directed towards the vortex stagnation point. The amount of air required to affect the inlet vortex is well within the bleed limits of the engine. However, tests have shown that steady blowing can have the same level of vortex alleviation as pulsing the jets. Additional testing would be required to determine if the pulsing jets would be more effective during crosswind conditions. This system also has the same potential problem as the previous mentioned system—impingement on the ground may create FOD. However, the amount of flow is lower and relative distance from the ground is much higher which may limit the amount of FOD generated.

None of the prior techniques has proven to be entirely satisfactory in an operational sense. Many airplanes operate in a manner and environment where the engines are exposed to continuous operation at high power, at low speeds and statically, over ramp surfaces which are not clean. In particular, some airplanes use thrust reverse powerback for parking and ground maneuvering. Thrust reverser operation is a condition that is even more susceptible to ground vortex formation. One of the salient features of flows with increased propensity to ground vortex activity is the unsteady characteristic of the air motion. There are numerous factors contributing to the apparent randomness of the flow in a realistic and an uncontrolled environment. These include gusts with varying strengths and direction (time-variation of ambient flow), ensuing structural response of aircraft components (i.e., the flexing of the entire wing/engine assembly) and the unsteady turbulent mixing of the thrust reverser plumes.

The existing techniques target specific flow situations and they do not provide effective solutions for real life applications. Specifically, they constitute 'point design' solutions since they provide localized treatment of a ground vortex without consideration to the inherent problem of sporadic vortex motion. It is therefore highly desirable to develop a robust technique that addresses the underlying problem associated with vortex ingestion.

SUMMARY

The present invention is an active system for the wide area suppression of a ground vortex generated by the engine of an aircraft. In a broad aspect it includes an actuator assembly in fluid communication with a fluid source; and, at least one nozzle assembly, including at least one movable nozzle. The movable nozzle is in fluid communication with the actuator assembly for receiving fluid from the actuator assembly. The actuator assembly controls the motion of the movable nozzle, wherein fluid is injected over a desired region relative to an inlet of the engine to disrupt the flow structure of a ground vortex, thus mitigating ground vortex ingestion. This ensures the operational health of the engine during airplane maneuvering on the ground. The fluid source is preferably the compressor of an engine of an aircraft.

Inlet vortices have plagued propeller and jet powered aircraft since their inception. Many solutions have been put forward with limited success in real life situations. Typically they have failed due to the complexity of the invention or by their limited capability to eliminate the inlet vortex. The present invention has addressed these shortfalls by: (a) considering the fundamental problem of unsteady characteristics of realistic inlet vortex flows, (b) keeping the invention simple by minimizing the number of moving parts, and (c) eliminating FOD due to the active system itself by preventing ground impingement of the control jet.

Other objects, advantages, and novel features will become apparent from the following detailed description of the invention when considered in conjunction with the accompanying drawings.

BRIEF DESCRIPTION OF THE DRAWINGS

FIG. 5a shows the streaklines before activation. FIG. 5b shows the streaklines after activation.

FIG. 7a shows the flow before jet activation. FIGS. 7b, 7c and 7d present the flow structure at 0.38, 0.76 and 1.14 seconds from the instant of jet application, respectively.

FIGS. 8a and 8b show front views of the flow pattern before and after jet application, respectively. FIGS. 8c and 8d show side views of the flowfield before and after jet activation, respectively.

The same parts or elements throughout the drawings are designated by the same reference characters.

DETAILED DESCRIPTION OF THE INVENTION

Figure 1:
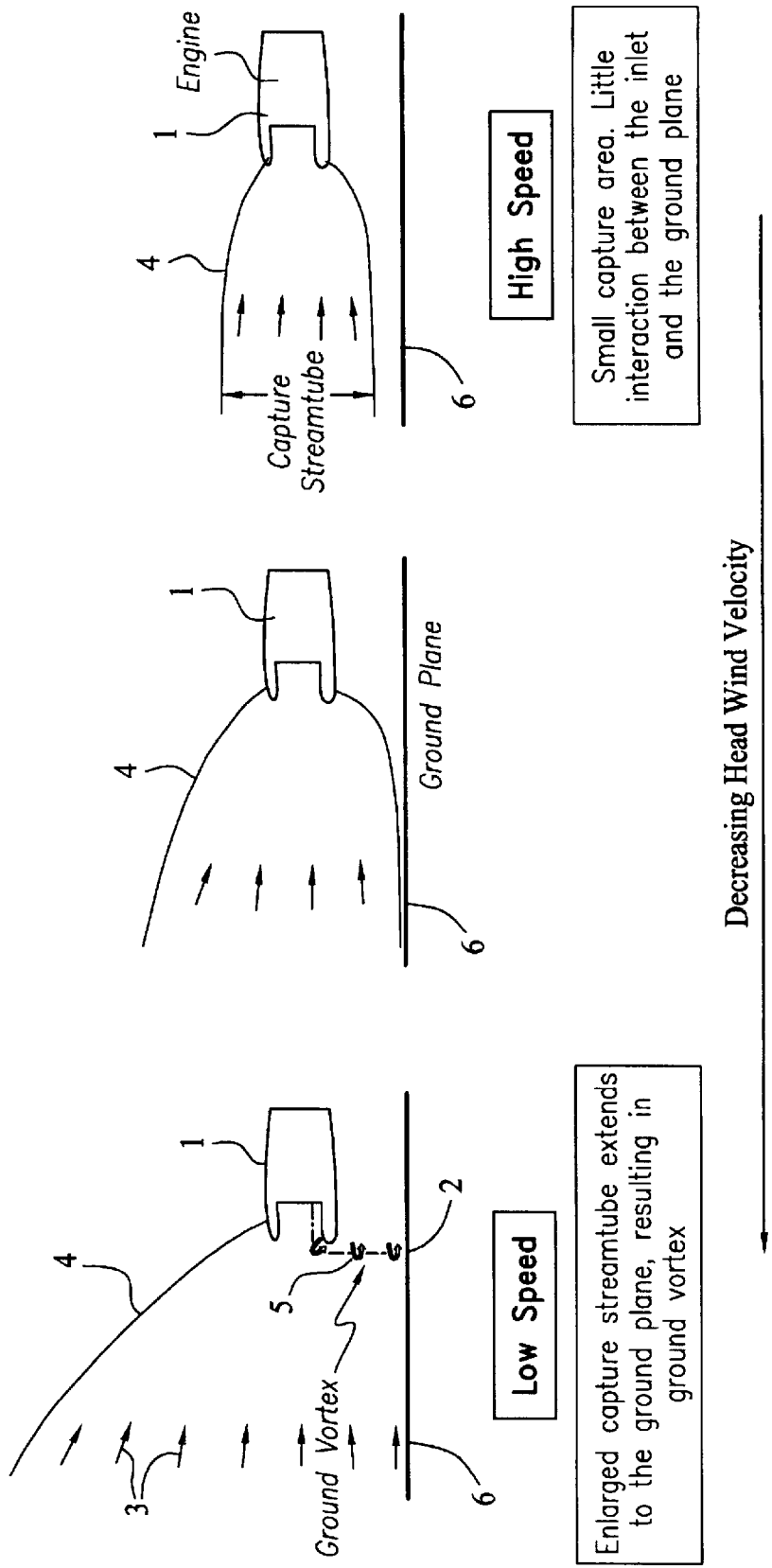
FIG. 1 (Prior Art) is a schematic illustration of the conditions for the formation of a ground vortex as a function of head wind velocity.
Figure 2:
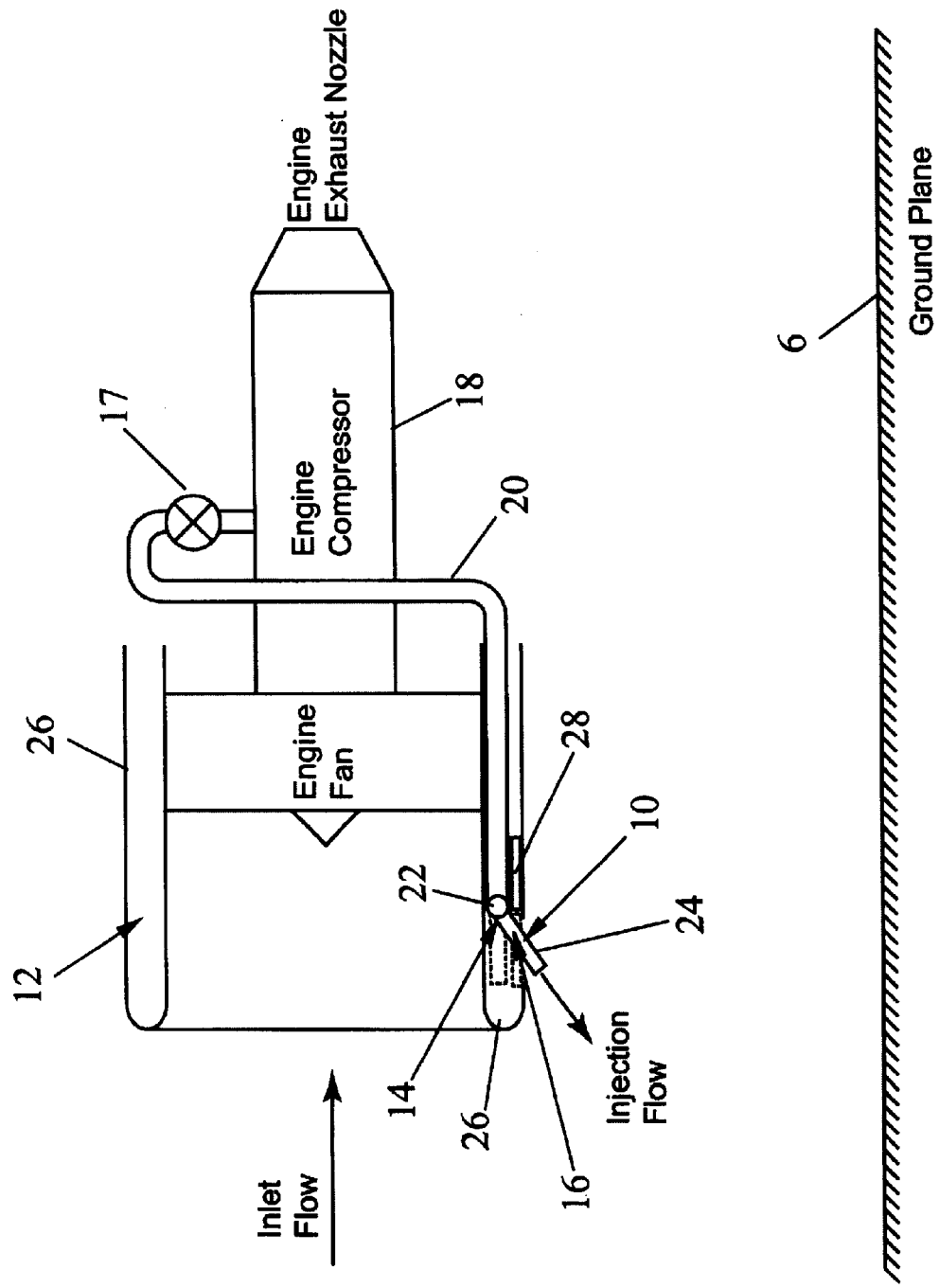
FIG. 2 is a schematic view of an aircraft engine that includes an embodiment of the active system for the wide area suppression of a ground vortex, of the present invention.

Referring again now to the drawings and the characters of reference marked thereon, FIG. 2 illustrates a preferred embodiment of the active system of the present invention, designated generally as 10, contained within an aircraft engine, designated generally as 12. The active system 10 includes an actuator assembly, designated generally as 14 and a nozzle assembly, designated generally as 16.

The actuator assembly 14 includes a shut-off valve 17 connected to the compressor 18 of the engine 12. In this particular embodiment a conduit 20 supplies the high pressure bleed air from the compressor 18 to a system actuator 22. A typical pressure range in which this system operates is between about 30 and 60 psig. The system actuator 22 includes a control system for controlling the shut-off valve 17 and a movable nozzle 24 of the nozzle assembly 16 to provide movement of the nozzle 24 through a desired path. The system actuator 22 may be, for example, pneumatically, electrically or hydraulically driven. The actuation system may be, for example, a cam system and linkages that are driven from any of these power sources. The nozzle 24 may be, for example, a simple convergent nozzle, or a convergent/divergent nozzle if higher velocities are required. The cross section of the nozzle can be circular or other suitable shape. The shape of the cross section of the nozzle can vary along nozzle length (for example, it can vary from a circular section to an elliptical section at the nozzle exit). The nozzle and distribution ducting downstream of the actuation system should be designed to minimize pressure losses, using techniques well known to those skilled in the art.

The movable nozzle 24 is deployable from within the cowl 26 of the engine 12. (Phantom lines indicate the stowed position.) It may be deployed by a variety of different methods that would be understood by those skilled in the art. For example, it may be deployed by utilization of a cowl 26 with a sliding door 28. The door 28 may be pneumatically actuated when the shut-off valve is opened. A portion of the air may be directed to a piston (not shown) which compression drives a linkage to open the door 28. When pressure is removed from the piston a spring (also not shown) closes the door 28.

Figure 3:
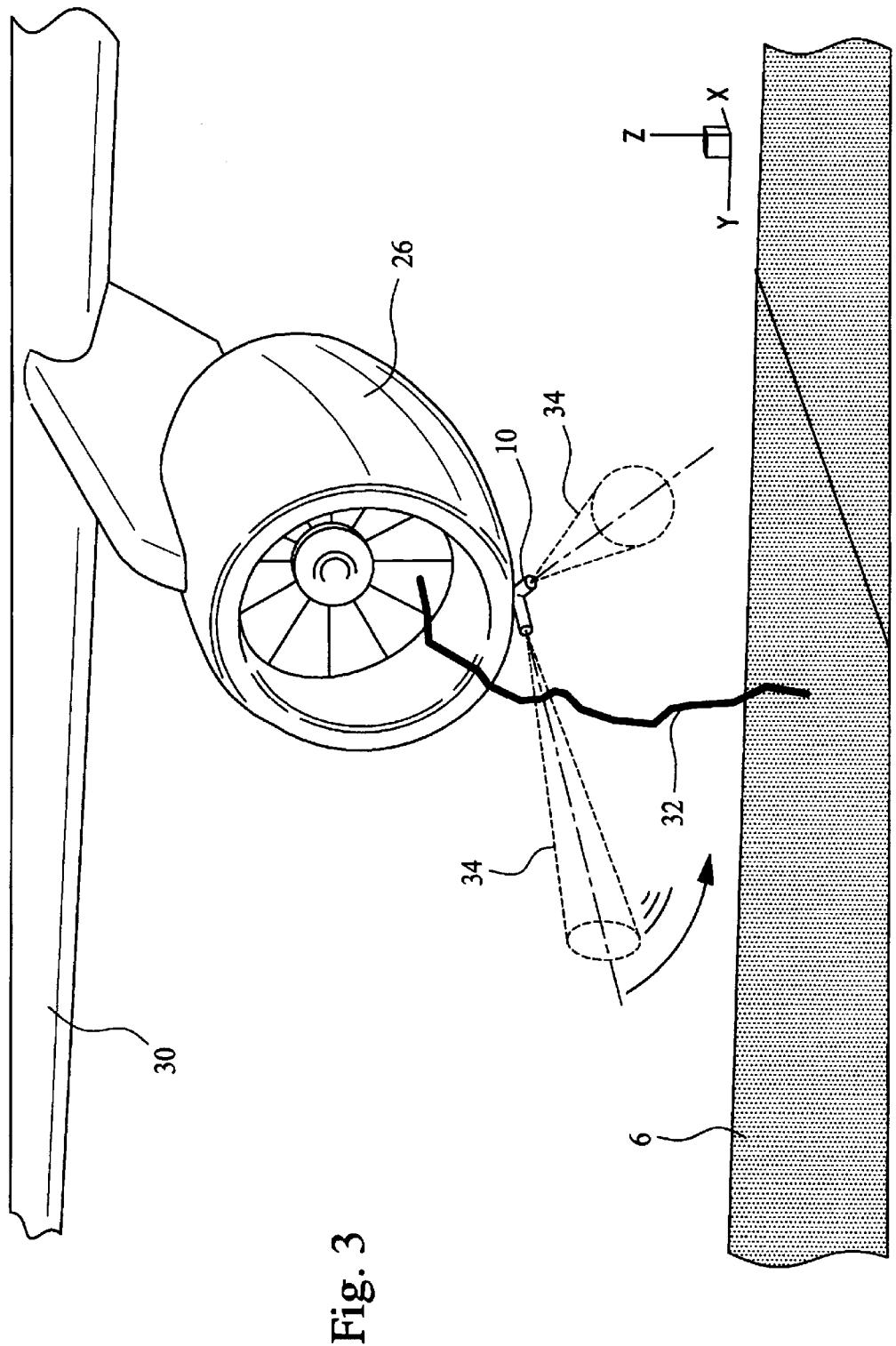
FIG. 3 is a perspective view of the active system of the present invention mounted on the underside of an engine cowl.
Figure 4:
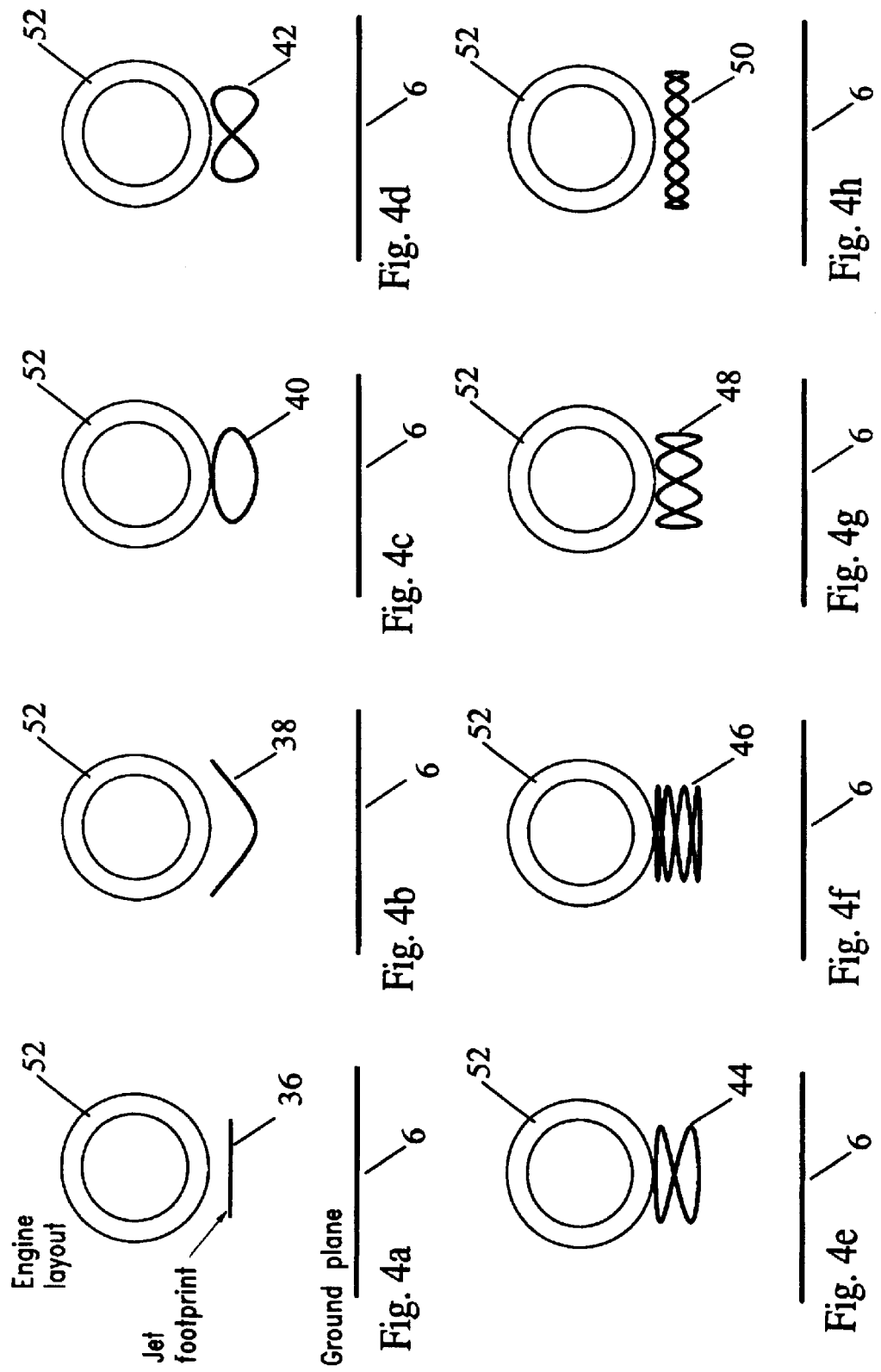
FIGS. 4a–4h illustrate examples of the variety of scanning patterns that may be provided by the present invention.

Referring now to FIG. 3, the active system 10 is shown in operation on an airplane 30. System 10 is shown deployed from the cowl 26. In this embodiment the nozzle is shown deployed from the bottom of the cowl 26. The nozzle, however, may be placed at other circumferential locations on the cowl. After deployment, the nozzle of the system 10 moves through a prescribed path to inject flow over a large region in front of the engine inlet. The slew motion of the ejecting fluid disrupts the global flow field in front of the engine and prevents the formation of vortices. A vortex filament 32 is illustrated in this figure. An active jet flow 34 from the system 10 is also illustrated. The controlled motion of the nozzle is predetermined in order to achieve best volume coverage and maximum vortex suppression.

Examples of scanning patterns are shown in FIGS. 4a–4h, in the form of jet footprints 36, 38, 40, 42, 44, 46, 48, 50, respectively, from the ground plane 6 upon imaginary vertical planes upstream of the engine 52 and perpendicular to its axis. These patterns have been obtained by using select combinations of sinusoidal, longitudinal and latitudinal motions (i.e., sets of amplitude, frequency and phase of the two angular motions). Other designs of nozzle motions and nozzle layouts can also be utilized, for example, configurations with multiple nozzles.

Figure 5:
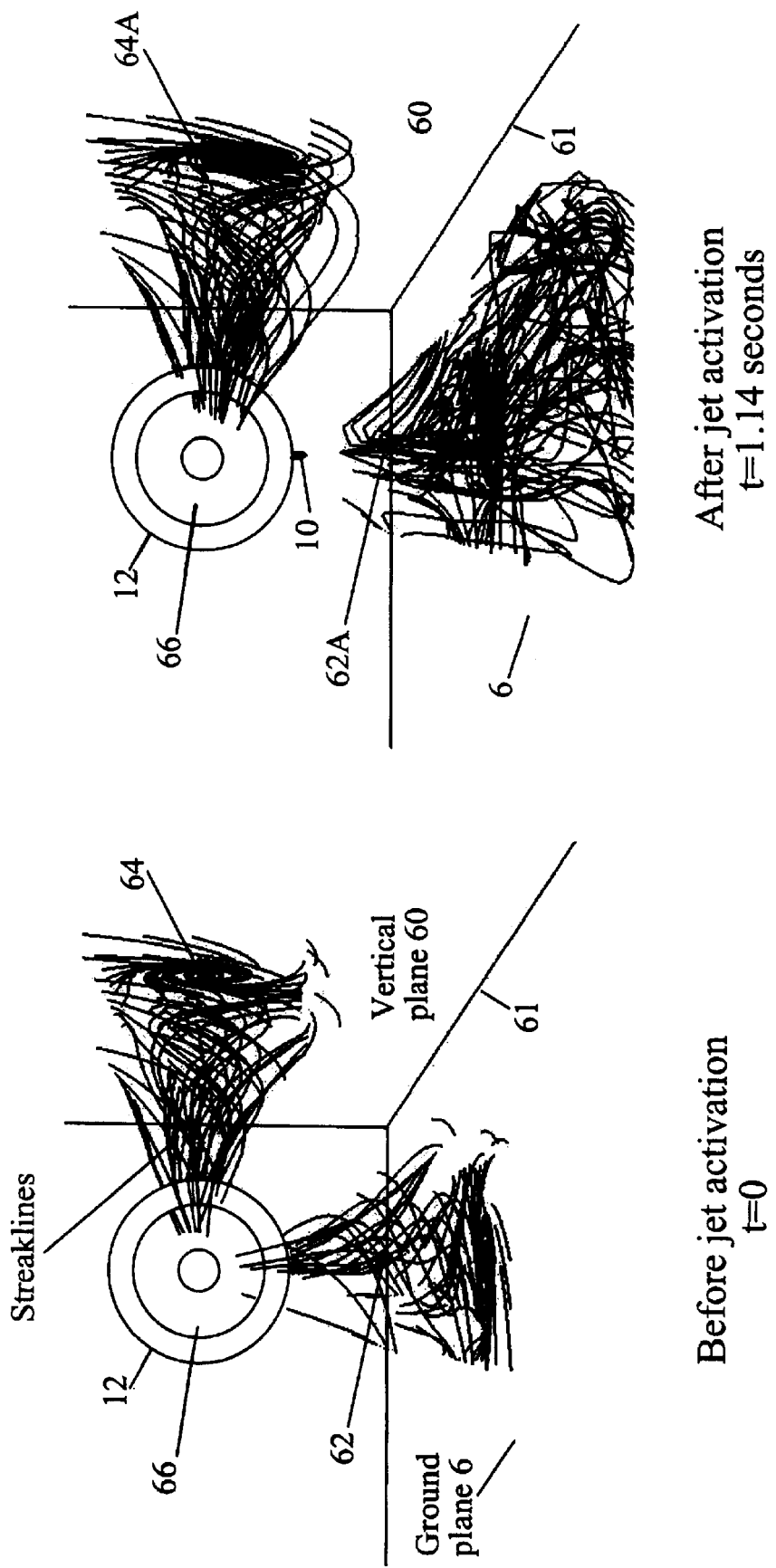
FIGS. 5a and 5b illustrate the effect of the ground vortex suppression on engine reingestion.

A Computational Fluid Dynamics procedure has been applied for the simulation of ground vortex ingestion. Referring now to FIGS. 5a and 5b, the effectiveness of the present method in reducing/eliminating engine ingestion of the ground vortex has been evaluated and is illustrated for an engine 12 placed at equal distances from the ground plane 6 and a vertical side plane 60. Tail wind onset flow is applied in this simulation since increased vortex susceptibility has been observed at this condition. For a high power setting the simulation results in a flow field which is symmetrical with respect to a 45° plane defined by the engine axis and the intersection line 61 between the ground 6 and the vertical planes 60. Specifically, the simulation results in a vortex system which consists of two elements with opposite swirl directions; one vortex 62 originates at the ground plane 6 and the other vortex element 64 forms at the side wall 60. The flow structure of FIG. 5a shows engine vortex ingestion, which is represented by the streaklines that terminate in the inlet 66. The vortex elements 62 and 64 show similar inlet ingestion patterns due to the ground 6 and the vertical plane 60, respectively.

When the active system of the present invention 10 is applied at the bottom side of the engine cowl, the flow field is no longer symmetrical. In this case the jet nozzle moves side-to-side within a ±20° range. This scanning pattern is described FIG. 4a. The resulting flow is shown in FIG. 5b. The intermittent mixing provided by the periodic side motion of the jet perturbs the flow in front of the engine and alters the shape of the vortex filament 62A from the ground plane 6 by reducing its strength and expelling it away from the engine. The vortex 64A from the vertical plane 60 is only slightly affected. Diagnostics of the flow field indicates that engine ingestion from the bottom side has been curbed while ingestion from the side wall still exists.

Figure 6:
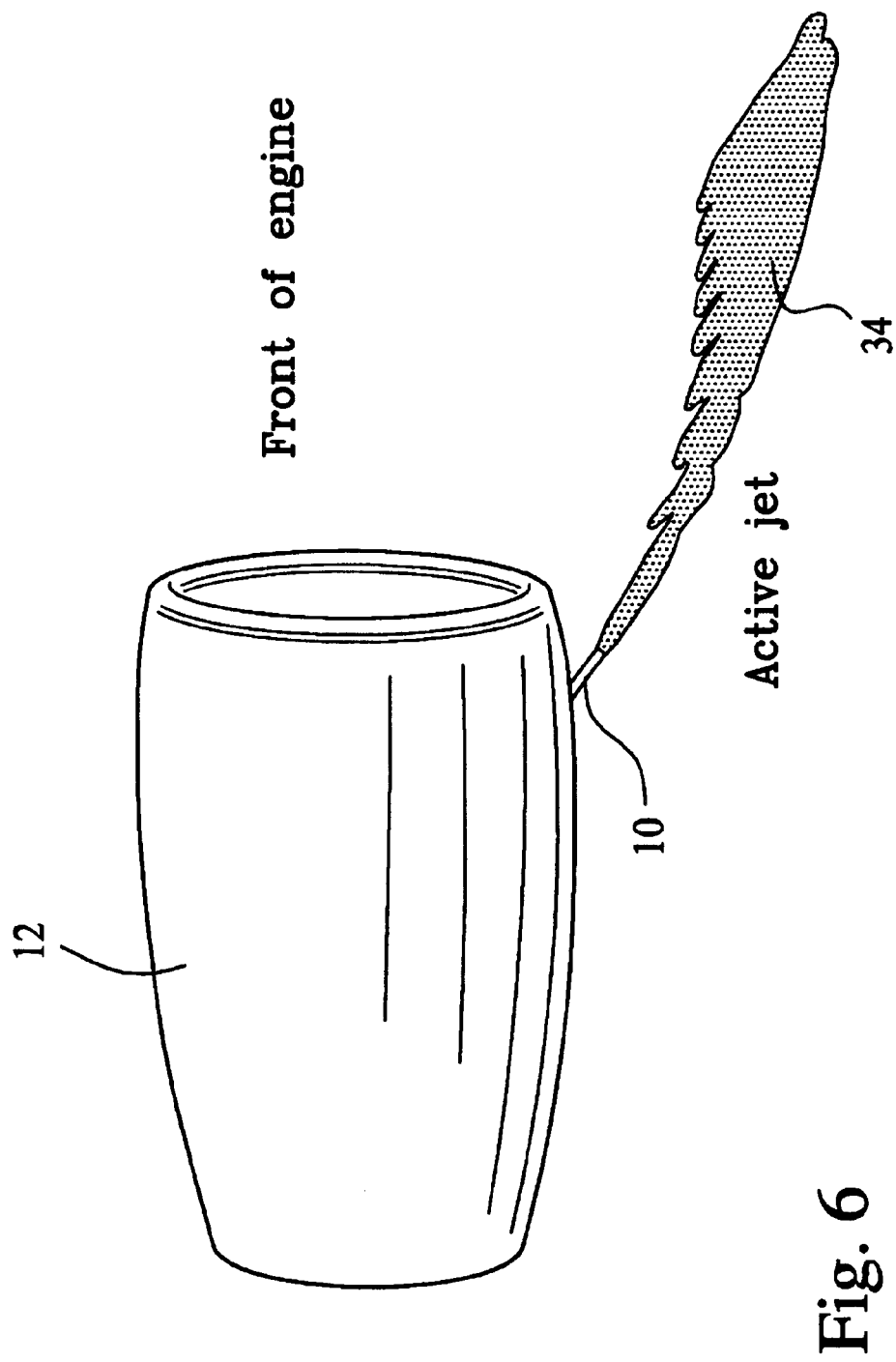
FIG. 6 illustrates the active jet provided by the present invention.
Figure 7B:
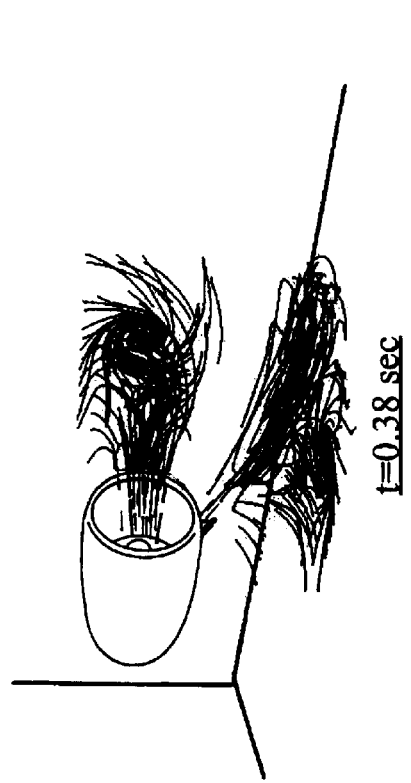
FIGS. 7a–7d show the time evolution of the flow pattern around an engine equipped with active flow control according to an embodiment of the present invention.
Figure 7D:
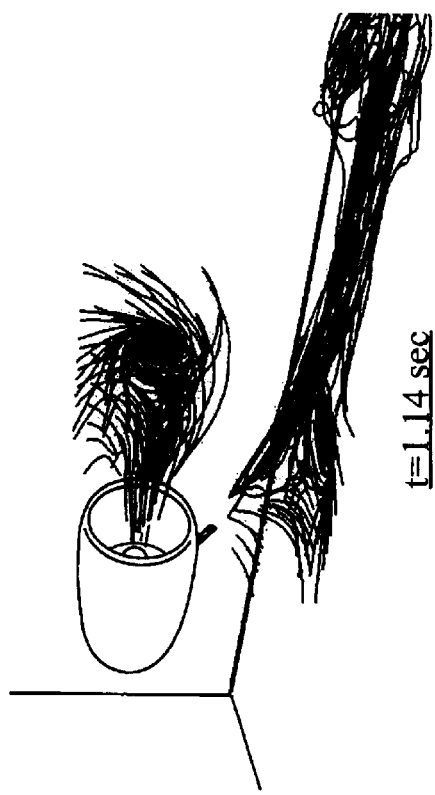
Figure 7A:
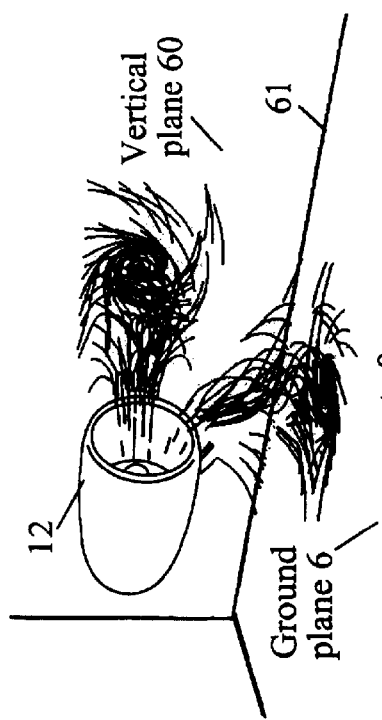
Figure 7C:
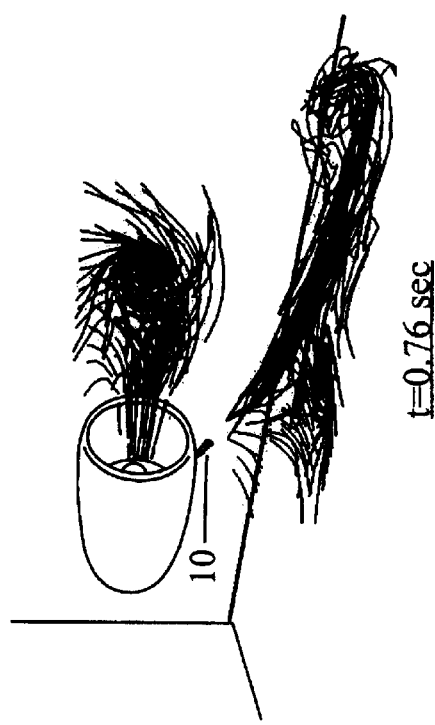

FIG. 6 is a side view of the engine 12 showing the jet flow pattern 34 after activation of the system 10.

FIGS. 7a, 7b, 7c and 7d depict a sequence of snapshots taken during the evolution of the flow pattern at 0, 0.38, 0.76 and 1.14 seconds from the instant of jet application, respectively. At the ground plane 6, the jet has resulted in reduced suction power. This analysis demonstrates that the present invention is very effective in reducing ground vortex ingestion and its concomitant, the risk of FOD.

Another potential shortfall of many inlet vortex mitigation schemes is ground impingement of the control jet. Ground impingement can create FOD by lifting debris from the ground that is then ingested into the engine. This invention reduces this effect by aiming the nozzle at the near horizontal plane (i.e., its nominal angular position about which the periodic motion is superimposed) and by constantly moving the control jet so that extended periods of ground impingement do not occur. Usually, the nozzle is directed at an angle of up to 40° off the horizontal plane.

Figure 8B:
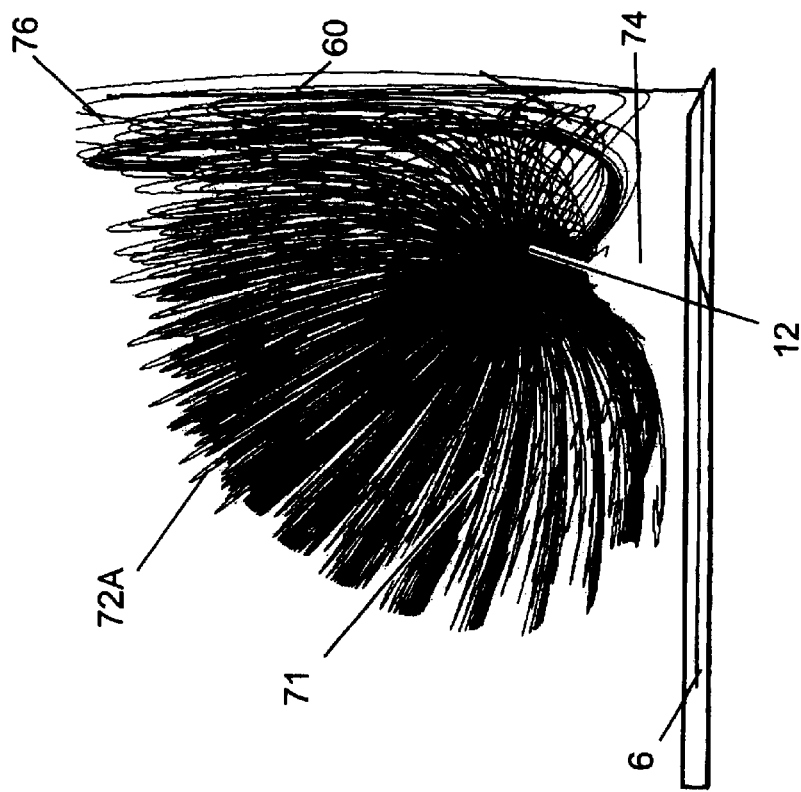
FIGS. 8a–8d provide an assessment of ground impingement of the active flow control of the present invention.
Figure 8A:
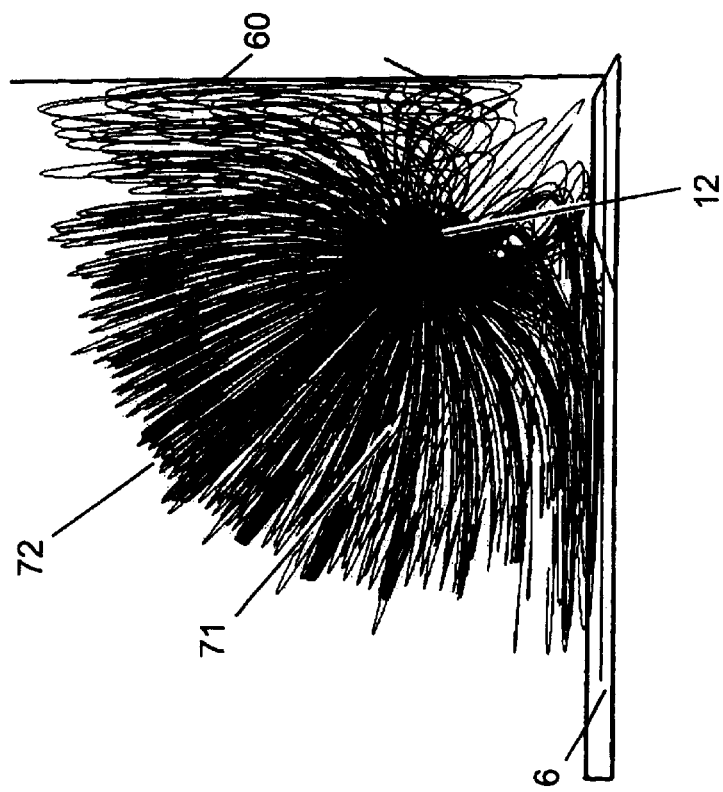
Figure 8D:
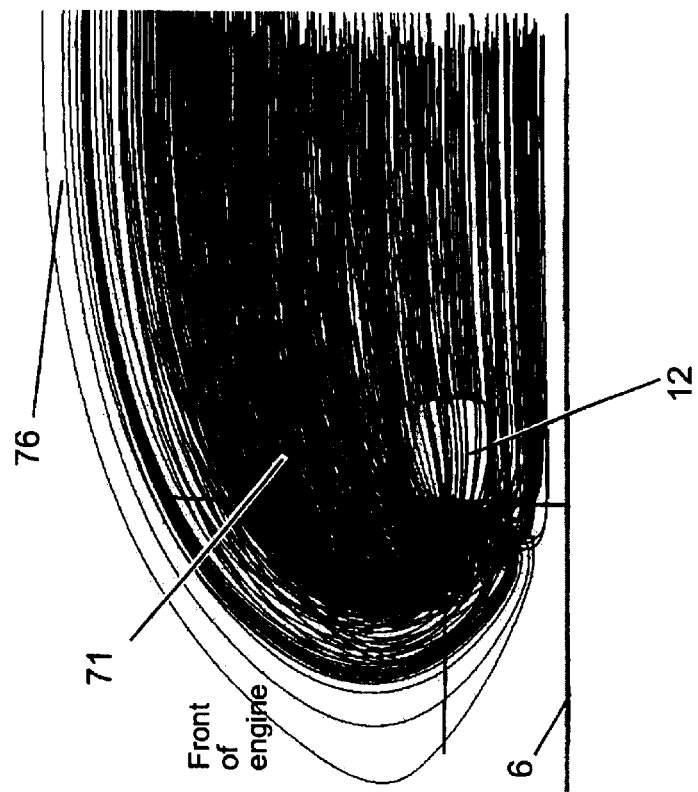
Figure 8C:
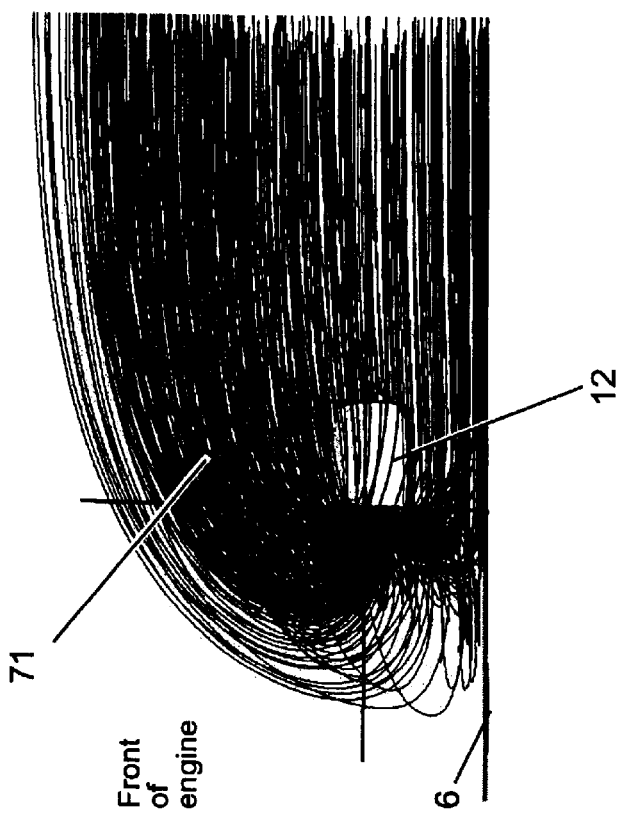

This benefit is illustrated in FIGS. 8a, 8b, 8c and 8d for the case described in FIGS. 5, 6 and 7a–d. The envelope of the ensemble of streamlines 71 represents the capture streamtube 72, which designates the domain of all the fluid particles ingested by the engine 12. The front views in FIGS. 8a and 8b (before and after jet activation, respectively) show that after activating the control jet the nearly symmetrical shape of the capture streamtube 72 is altered (into 72A) and the flow adjacent to the ground plane 6 is profoundly affected. More specifically, the capture streamtube 72A is being pushed upward with a large depression occurring just under the engine 12 in region 74. The implication is that there is no debris ingestion from the ground. The side view of the flow structure is shown in FIGS. 8c and 8d (before and after jet activation, respectively). Note that since the power setting of the engine is constant, the engine 12 makes up for the mass flow depletion from underneath by expanding the capture streamtube in the region 76 above it.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

What is claimed is:

1. An active system for the wide area suppression of a ground vortex generated by the engine of an aircraft, comprising:

a) an actuator assembly in fluid communication with a fluid source; and, b) at least one nozzle assembly, including at least one movable nozzle, said at least one movable nozzle being in fluid communication with said actuator assembly for receiving fluid from said actuator assembly, said actuator assembly controlling the motion of said movable nozzle and thereby adjusting a direction of said nozzle during operation of said nozzle, wherein fluid is injected over a desired region relative to an inlet of the engine to disrupt the flow structure of a ground vortex, thus mitigating ground vortex ingestion.

2. The active system of claim 1, wherein said fluid source comprises a compressor of an engine of an aircraft.

3. The active system of claim 2, wherein said actuator assembly, comprises:

a) a shut-off valve connected to the compressor of the engine; and, b) a system actuator in fluid communication with an outlet of said shut-off valve.

4. The active system of claim 2, wherein said actuator assembly, comprises:

a) a shut-off valve connected to the compressor of the engine; and, b) a system actuator in fluid communication with an outlet of said shut-off valve, said system actuator further including a control system for controlling said shut-off valve and said at least one movable nozzle so as to provide movement of said nozzle through a desired path.

5. The active system of claim 2, wherein said actuator assembly, comprises:
   a) a shut-off valve connected to the compressor of the engine; and,
   b) a system actuator in fluid communication with an outlet of said shut-off valve, said system actuator further including a pneumatically driven control system for controlling said shut-off valve and said at least one movable nozzle so as to provide movement of said nozzle through a desired path.

6. The active system of claim 2, wherein said actuator assembly, comprises:
   a) a shut-off valve connected to the compressor of the engine; and,
   b) a system actuator in fluid communication with an outlet of said shut-off valve, said system actuator further including an electrically driven control system for controlling said shut-off valve and said at least one movable nozzle so as to provide movement of said nozzle through a desired path.

7. The active system of claim 2, wherein said actuator assembly, comprises:
   a) a shut-off valve connected to the compressor of the engine; and,
   b) a system actuator in fluid communication with an outlet of said shut-off valve, said system actuator further including a hydraulically driven control system for controlling said shut-off valve and said at least one movable nozzle so as to provide movement of said nozzle through a desired path.

8. The active system of claim 1, wherein said movable nozzle is deployable from within a cowl of the engine.

9. The active system of claim 1, wherein said movable nozzle is deployable from within a cowl of the engine, said cowl including a sliding door for providing an opening for nozzle deployment.

10. The active system of claim 1, wherein a controlled slew motion of said at least one moveable nozzle is provided in both longitudinal and the latitudinal directions for maximum vortex suppression.

11. The active system of claim 1, wherein said movable nozzle is deployable from within a cowl of the engine at a near horizontal angle.

12. The active system of claim 1, wherein said movable nozzle has a cross-sectional area that varies along the nozzle length.

13. The active system of claim 1, wherein said movable nozzle is a convergent nozzle.

14. The active system of claim 1, wherein said movable nozzle has a circular cross section.

15. An aircraft engine assembly providing a suppressed ground vortex, comprising:
   a) a cowl;
   b) an aircraft engine supported within said cowl; and,
   c) an active system for the wide area suppression of a ground vortex generated by said aircraft engine, comprising:
      i) an actuator assembly in fluid communication with a compressor of said aircraft engine; and,
      ii) at least one nozzle assembly, including at least one movable nozzle, said at least one movable nozzle being in fluid communication with said actuator assembly for receiving fluid from said actuator assembly and a direction of said movable nozzle being adjustable during operation of said nozzle so as to inject fluid over a desired region relative to an inlet of the aircraft engine to disrupt the flow structure of a ground vortex, thus mitigating ground vortex ingestion.

16. The aircraft engine assembly of claim 15, wherein said actuator assembly, comprises:
   a) a shut-off valve connected to the compressor of the engine; and,
   b) a system actuator in fluid communication with an outlet of said shut-off valve.

17. The aircraft engine assembly of claim 15, wherein said actuator assembly, comprises:
   a) a shut-off valve connected to the compressor of the engine; and,
   b) a system actuator in fluid communication with an outlet of said shut-off valve, said system actuator further including a control system for controlling said shut-off valve and said at least one movable nozzle so as to provide movement of said nozzle through a desired path.

18. The aircraft engine assembly of claim 15, wherein said actuator assembly, comprises:
   a) a shut-off valve connected to the compressor of the engine; and,
   b) a system actuator in fluid communication with an outlet of said shut-off valve, said system actuator further including a pneumatically driven control system for controlling said shut-off valve and said at least one movable nozzle so as to provide movement of said nozzle through a desired path.

19. The aircraft engine assembly of claim 15, wherein said actuator assembly, comprises:
   a) a shut-off valve connected to the compressor of the engine; and,
   b) a system actuator in fluid communication with an outlet of said shut-off valve, said system actuator further including an electrically driven control system for controlling said shut-off valve and said at least one movable nozzle so as to provide movement of said nozzle through a desired path.

20. The aircraft engine assembly of claim 15, wherein said actuator assembly, comprises:
   a) a shut-off valve connected to the compressor of the engine; and,
   b) a system actuator in fluid communication with an outlet of said shut-off valve, said system actuator further including a hydraulically driven control system for controlling said shut-off valve and said at least one movable nozzle so as to provide movement of said nozzle through a desired path.

21. A method for the wide area suppression of a ground vortex generated by the engine of an aircraft, comprising the steps of:
   a) actuating a movable nozzle so as to adjust said nozzle to a desired direction relative to a cowl of an aircraft engine; and,
   b) at least partially during said actuating step, discharging fluid from said movable nozzle to a desired region relative to an inlet of the engine to disrupt the flow structure of a ground vortex, so as to mitigate ground vortex ingestion.

22. The method of claim 21, wherein said fluid is discharged from within a cowl of the engine at a near horizontal angle.

23. The method of claim 21, wherein said fluid being discharged originates from a compressor of said aircraft engine.

* * * * *